United States Patent
Ohki et al.

(10) Patent No.: US 10,605,366 B2
(45) Date of Patent: Mar. 31, 2020

(54) PRESSURE RING

(71) Applicant: Toyota Jidosha Kabushiki Kaisha, Toyota-shi, Aichi-ken (JP)

(72) Inventors: Hisashi Ohki, Numazu (JP); Takashi Koyama, Mishima (JP); Hiroshi Yaguchi, Susono (JP); Yusuke Morita, Mishima (JP); Takashi Suzuki, Izunokuni (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/950,744

(22) Filed: Apr. 11, 2018

(65) Prior Publication Data
US 2018/0299011 A1    Oct. 18, 2018

(30) Foreign Application Priority Data
Apr. 14, 2017  (JP) .................... 2017-080775

(51) Int. Cl.
| F16J 9/20 | (2006.01) |
| F02F 5/00 | (2006.01) |
| F16J 1/08 | (2006.01) |
| F02F 3/00 | (2006.01) |

(52) U.S. Cl.
CPC  F16J 9/20 (2013.01); F02F 5/00 (2013.01); F16J 1/08 (2013.01); F02F 3/0015 (2013.01)

(58) Field of Classification Search
CPC . F16J 9/20; F16J 1/08; F16J 9/00; F16J 9/12; F16J 9/16; F02F 5/00; F02F 3/0015
See application file for complete search history.

(56) References Cited

U.S. PATENT DOCUMENTS

| 2,096,003 A | | 10/1937 | Morton et al. | |
|---|---|---|---|---|
| 2,209,925 A | * | 7/1940 | Mason | F16J 9/20 277/465 |
| 2,212,335 A | * | 8/1940 | Wenzel | F16J 9/20 277/460 |
| 2,226,921 A | * | 12/1940 | Hawker | F16J 9/20 277/465 |
| 2,428,031 A | * | 9/1947 | Mayes | F16J 9/12 277/449 |
| 4,438,937 A | * | 3/1984 | Moriarty | F16J 9/20 277/447 |

FOREIGN PATENT DOCUMENTS

| EP | 0695894 A1 | 2/1996 |
| JP | S60004740 U | 1/1985 |
| JP | S60047856 U | 4/1985 |
| JP | S60122555 U | 8/1985 |

(Continued)

*Primary Examiner* — Gilbert Y Lee
(74) *Attorney, Agent, or Firm* — Dinsmore & Shohl LLP (57) ABSTRACT

A pressure ring includes a first pressure ring fitted in a first ring groove of a piston; and a second pressure ring fitted in a second ring groove of the piston, and positioned between the first pressure ring and an oil ring. The second pressure ring is provided with a groove that extends across a surface of the second pressure ring from an inner peripheral side to an outer peripheral side. The groove is configured such that at least one of a width and a depth of the groove becomes larger toward the outer peripheral side from the inner peripheral side.

6 Claims, 5 Drawing Sheets

(56) References Cited

FOREIGN PATENT DOCUMENTS

| JP | S63-230949 A | 9/1988 |
|----|--------------|--------|
| JP | H03213643 A | 9/1991 |
| JP | 2014-098471 A | 5/2014 |
| JP | 2014-098473 A | 5/2014 |
| JP | 2014-101893 A | 6/2014 |

\* cited by examiner

PRESSURE RING

CROSS-REFERENCE TO RELATED APPLICATIONS

This application claims priority to Japanese Patent Application No. 2017-080775 filed on Apr. 14, 2017, which is incorporated herein by reference in its entirety including the specification, drawings and abstract.

BACKGROUND

1. Technical Field

The disclosure relates to a pressure ring fitted to a piston in an internal combustion engine, particularly to a structure of a second pressure ring disposed between a first pressure ring and an oil ring.

2. Description of Related Art

For example, Japanese Unexamined Patent Application Publication No. 3-213643 (JP 3-213643 A) describes a technology relating to a second pressure ring among piston rings fitted in ring grooves of a piston in an internal combustion engine. The second pressure ring is disposed between a first pressure ring and an oil ring. In the technology described in JP 3-213643 A, a plurality of grooves is formed on an upper surface and a lower surface of the second pressure ring, the grooves extending from an inner peripheral side to reach an outer peripheral side. The second pressure ring moves upward and downward within a range of a width of the ring groove due to inertia force generated by upward and downward movements of the piston. With the structure of the second pressure ring described in JP 3-213643 A, when the second pressure ring moves to an upper surface of the groove and when the second pressure ring moves to a lower surface of the groove during a high-load operation of the internal combustion engine, the groove serves as a blowby passage, and blow-down of oil occurs due to blowby. Accordingly, oil is prevented from moving upward during a high-load operation of the internal combustion engine.

SUMMARY

As described above, the second pressure ring moves upward and downward between the upper surface and the lower surface of the ring groove. More specifically, during the later stages of an intake stroke and an expansion stroke, lowering speed of the piston inside a cylinder is decreased. Therefore, inertia force in a downward direction is applied to oil and the second pressure ring descending inside the cylinder together with the piston. In this case, when the second pressure ring moves quickly to the lower surface side of the ring groove, it is possible to bring oil back to a groove between the upper surface of the ring groove and the second pressure ring.

However, the second pressure ring does not always move in quick response to an action of inertia force, because the second pressure ring adheres to a surface of the ring groove due to adhesion force of oil. The technology in JP 3-213643 A is described on the assumption that the second pressure ring quickly moves upward and downward, and no consideration is given to adhesion force generated in the second pressure ring, the adhesion force causing the second pressure ring to adhere to the ring groove. When it is possible to cause the second pressure ring to move in quick response to an action of inertia force, it is expected to further reduce an oil consumption amount.

The disclosure provides a pressure ring that makes it possible to reduce oil consumption.

A pressure ring according to an aspect of the disclosure includes a first pressure ring fitted in a first ring groove of a piston; and a second pressure ring fitted in a second ring groove of the piston, and positioned between the first pressure ring and an oil ring. The second pressure ring is provided with a groove that extends across a surface of the second pressure ring from an inner peripheral side to an outer peripheral side. The groove is configured such that at least one of a width and a depth of the groove becomes larger toward the outer peripheral side from the inner peripheral side.

The groove provided in the second pressure ring is configured such that at least one of the width and the depth of the groove becomes larger toward the outer peripheral side from the inner peripheral side. Adhesion force between a surface of the second pressure ring and a surface of the second ring groove in the piston becomes larger as a contact area between the surfaces becomes larger, and as a distance between the surfaces becomes shorter. Therefore, with the structure of the groove in the above aspect of the disclosure, adhesion force becomes smaller (i.e., adhesion force decreases) from the inner peripheral side toward the outer peripheral side of the second pressure ring. Thus, when the second pressure ring receives inertia force, torsional moment is generated on the second pressure ring, the torsional moment twisting the outer peripheral side of the second pressure ring in the direction of the inertia force. Therefore, it is possible to cause the second pressure ring adhering to the surface of the second ring groove to come off from the surface and to move in quick response. Thus, it is possible to bring back oil into a gap between the second pressure ring and the second ring groove in quick response, thereby reducing oil consumption.

In the above aspect of the disclosure, the groove may be provided on an upper surface of the second pressure ring.

Further, in the above aspect of the disclosure, the groove may be provided on a lower surface of the second pressure ring.

Furthermore, in the above aspect of the disclosure, the second pressure ring may be provided with a plurality of the grooves.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the disclosure are described with reference to the drawings. However, the disclosure is not limited to the numbers, volumes, quantities, ranges, and so on that are stated in the embodiments regarding respective components, excluding the case where those numbers and so on are particularly specified or obviously specified in principle.

Hereinafter, a first embodiment of the disclosure is described with reference to the drawings.

Figure 1:
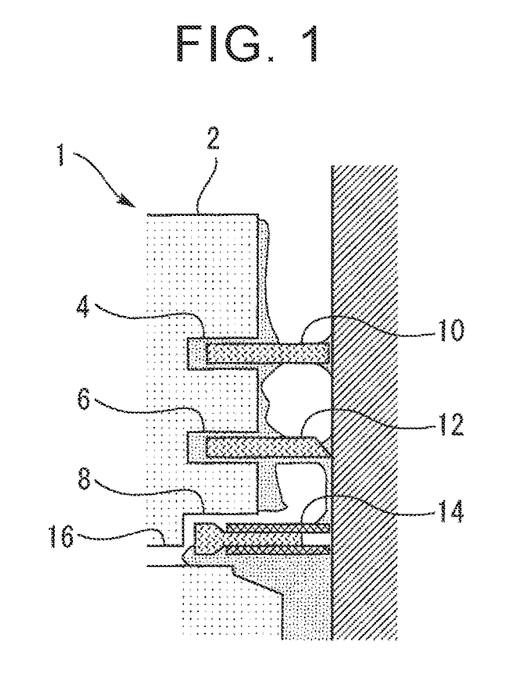
FIG. 1 is a view illustrating a sectional structure of a piston in an internal combustion engine to which a pressure ring according to a first embodiment of the disclosure is applied.

FIG. 1 is a view illustrating a sectional structure of a piston in an internal combustion engine (an engine) to which a pressure ring according to the first embodiment of the disclosure is applied. As shown in the drawing, a piston 1 has a substantially cylindrical shape having a top surface 2, and is disposed so as to move upward and downward in an axis direction of a cylinder bore. In the description below, with regard to directions along the axis direction of the cylinder bore, a direction in which the piston 1 moves upward is referred to as an upward direction, and a direction in which the piston 1 moves downward is referred to as a downward direction.

In an outer peripheral surface of the piston 1, a first pressure ring groove (first ring groove) 4, a second pressure ring groove (second ring groove) 6, and an oil ring groove 8 are formed in the entire circumference in the stated order from the top surface 2-side. In the first pressure ring groove 4, a first pressure ring 10 is fitted. In the second pressure ring groove 6, a second pressure ring 12 is fitted. In the oil ring groove 8, an oil ring 14 is fitted. In the piston 1, an oil drain hole 16 is formed. The oil ring groove 8 and a crankcase communicate with each other via the oil drain hole 16 (in other words, the oil drain hole 16 provides communication between the oil ring groove 8 and the crankcase).

Each of the first pressure ring 10 and the second pressure ring 12 has an annular shape, and has a function of maintaining air-tightness of a combustion chamber by contacting an inner wall of the cylinder bore. Each of the first pressure ring 10 and the second pressure ring 12 also has a function of conducting heat to the inner wall of the cylinder bore, the heat being received by the piston 1 due to combustion inside the combustion chamber. Further, each of the first pressure ring 10 and the second pressure ring 12 has a function of scraping oil that passes the oil ring 14 and moves toward the top surface 2. The oil ring 14 has an annular shape, and a section of the oil ring 14 has a substantially U-shape. The oil ring 14 has a structure suitable for scraping oil between the inner wall of the cylinder bore and the outer peripheral surface of the piston.

The first pressure ring 10, the second pressure ring 12, and the oil ring 14 are fitted in the first pressure ring groove 4, the second pressure ring groove 6, and the oil ring groove 8, respectively, and widths of the first pressure ring groove 4, the second pressure ring groove 6, and the oil ring groove 8 are larger than thicknesses of the first pressure ring 10, the second pressure ring 12, and the oil ring 14, respectively. That is, the first pressure ring 10, the second pressure ring 12, and the oil ring 14 are configured to be movable upward and downward in the first pressure ring groove 4, the second pressure ring groove 6, and the oil ring groove 8, respectively, while being fitted in the grooves, respectively. In the description below, in a peripheral surface of the piston 1, a surface between the top surface 2 and the first pressure ring groove 4 is referred to as a "first land", a surface between the first pressure ring groove 4 and the second pressure ring groove 6 is referred to as a "second land", and a surface between the second pressure ring groove 6 and the oil ring groove 8 is referred to as a "third land".

Next, a feature of the pressure ring according to the first embodiment is described. The pressure ring according to the first embodiment includes the first pressure ring 10 and the second pressure ring 12, and the structure of the second pressure ring 12 has a feature. Here, before describing the feature of the second pressure ring 12, a function and a problem of a conventional second pressure ring are described.

Figure 2:
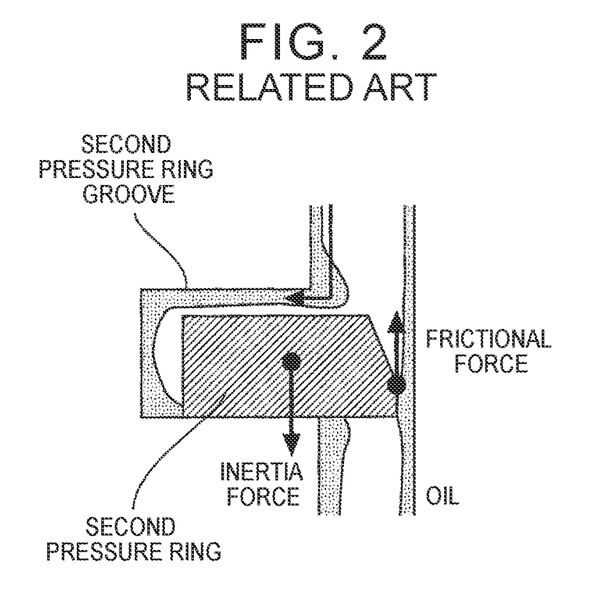
FIG. 2 is a view illustrating a sectional structure of a conventional second pressure ring that is fitted in a second pressure ring groove.

FIG. 2 is a view illustrating a sectional structure of a conventional second pressure ring fitted in a second pressure ring groove. As described above, the piston 1 moves upward and downward inside the cylinder bore. More specifically, during an intake stroke and an expansion stroke of the internal combustion engine, the piston 1 moves downward, and, during a compression stroke and an exhaust stroke, the piston 1 moves upward. Therefore, in the later stages of the intake stroke and the expansion stroke of the internal combustion engine, inertia force in the downward direction acts on the piston 1, and in the later stages of the compression stroke and the exhaust stroke, inertia force in the upward direction acts on the piston 1. The example shown in the drawing illustrates a state where inertia force in the downward direction and frictional force in the upward direction are acting on the piston 1 in the later stage of the intake stroke. When inertia force in the downward direction acts on the piston 1, inertia force in the same direction also acts on the second pressure ring 12 fitted to the piston 1, and oil adhering to the second land. When the second pressure ring receives inertia force and moves downward, a lower surface of the second pressure ring contacts a lower surface of the second pressure ring groove, and a gap between an upper surface of the second pressure ring and an upper surface of the second pressure ring groove increases. Oil adhering to the second land moves downward due to the action of inertia force, and is brought back from the gap to the inside of the second pressure ring groove. Thus, oil adhering to the second land is restrained from moving up to the combustion chamber, thereby reducing oil consumption.

Figure 3:
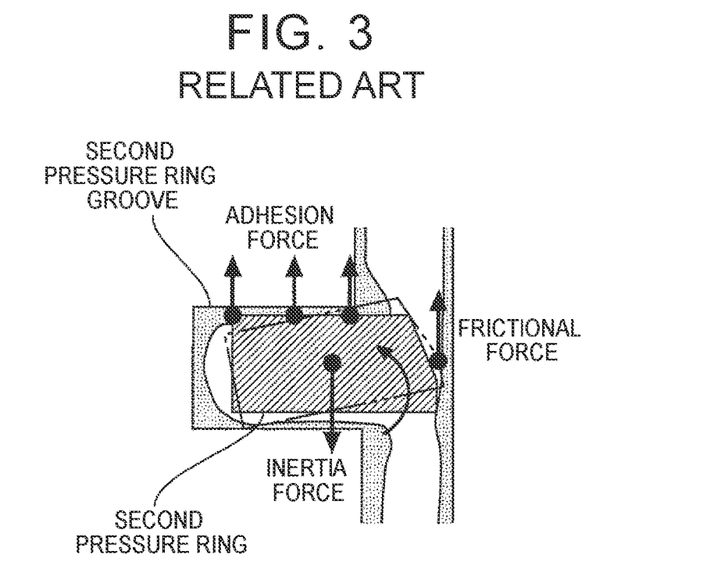
FIG. 3 is a view illustrating the sectional structure of the conventional second pressure ring fitted in the second pressure ring groove.

However, the structure of the conventional second pressure ring has the following problem. FIG. 3 is a view illustrating the sectional structure of the conventional second pressure ring fitted in the second pressure ring groove. The example shown in the drawing illustrates a state where inertia force in the downward direction and frictional force in the upward direction are acting on the piston 1 during the later stage of the intake stroke. Adhesion force is acting on the upper surface of the second pressure ring substantially evenly, the adhesion force causing the upper surface of the second pressure ring to adhere to the upper surface of the second pressure ring groove. In this situation, even when inertia force in the downward direction acts on the second pressure ring, the second pressure ring may not move downward in quick response. The example shown in the drawing illustrates a state where the second pressure ring comes off from an inner peripheral side as torsional moment caused by the frictional force acts on the second pressure ring. However, in recent developments, it is required to further reduce friction between a piston and a cylinder bore to improve fuel efficiency. Therefore, it is desired to cause torsional moment to act on the second pressure ring without using frictional force.

Figure 4:
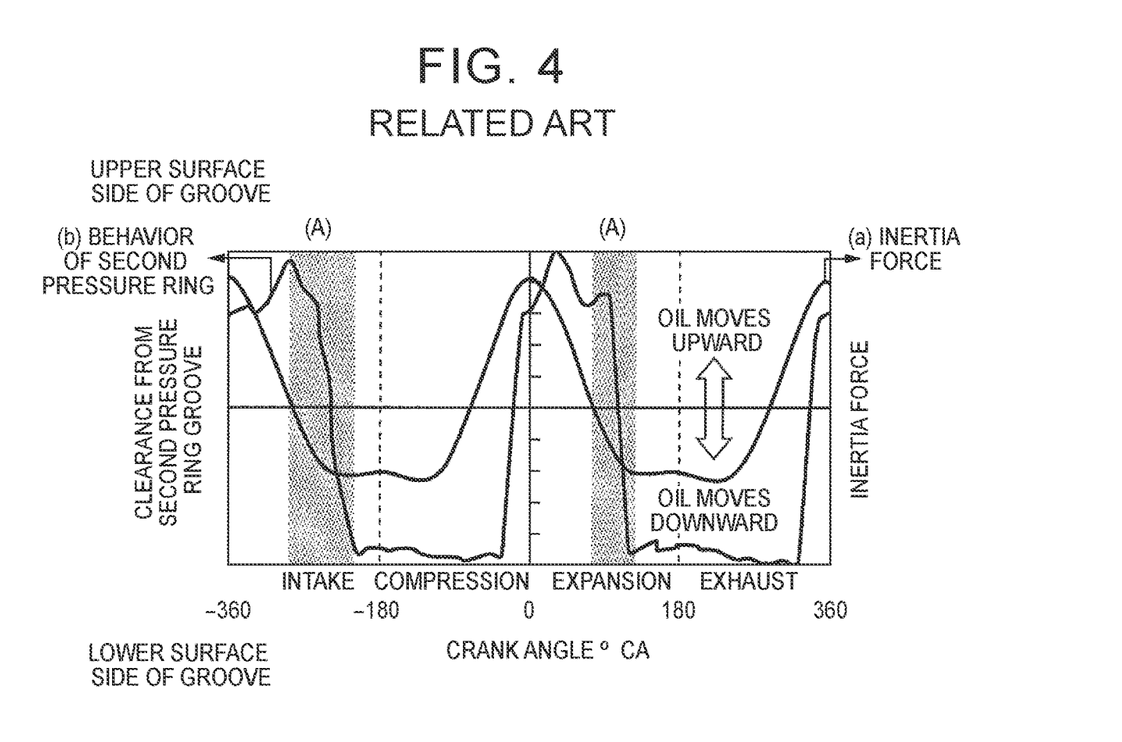
FIG. 4 is a graph indicating the behavior of the conventional second pressure ring with respect to a crank angle.

FIG. 4 is a graph illustrating the behavior of the conventional second pressure ring with respect to a crank angle. In this graph, (a) indicates how inertia force changes with respect to the crank angle, and (b) indicates how clearance between the second pressure ring and the second pressure ring groove changes with respect to the crank angle. As shown by regions (A) in the graph, it is understood that, even when the direction of inertia force acting on the second pressure ring changes from the upward direction to the downward direction, the second pressure ring does not move in quick response toward the lower surface side of the second pressure ring groove.

Figure 5:
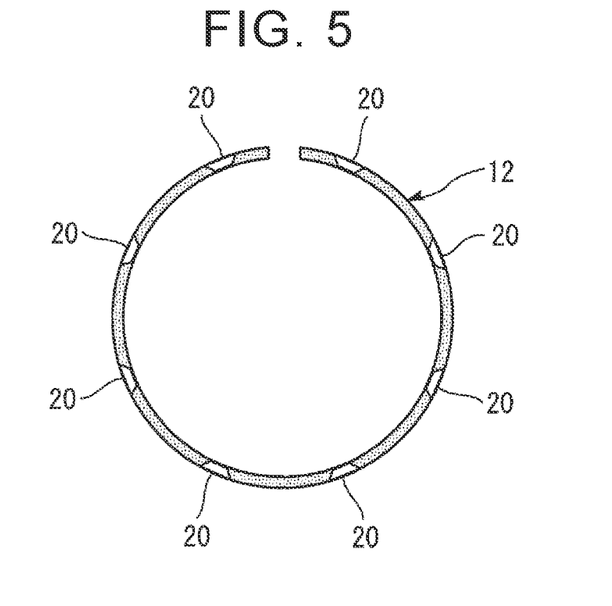
FIG. 5 is a front view of a second pressure ring according to the first embodiment.

The second pressure ring according to the first embodiment has a feature regarding a shape of a groove provided on the upper surface of the second pressure ring. FIG. 5 is a front view of the second pressure ring according to the first embodiment. As shown m the drawing, a plurality of grooves 20 is formed on the upper surface of the second pressure ring 12. The grooves 20 are provided so as to extend across the upper surface of the second pressure ring 12 from an inner peripheral side toward an outer peripheral side. The number and disposition (arrangement) of the grooves 20 are not particularly limited. In the example shown in FIG. 5, eight grooves 20 are provided at equal intervals to extend radially from the center of the ring.

Figure 6:
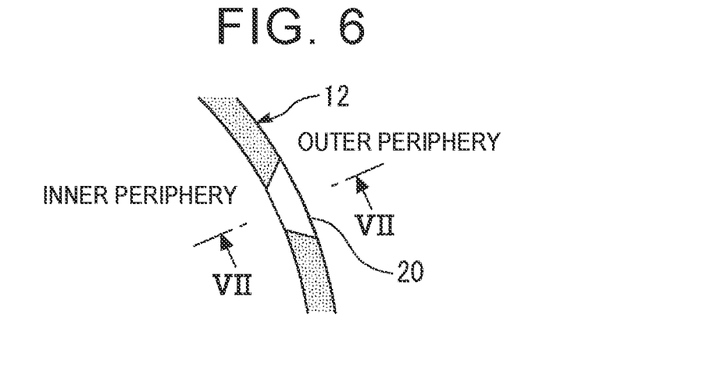
FIG. 6 is an enlarged front view of a groove in the second pressure ring according to the first embodiment.
Figure 7:
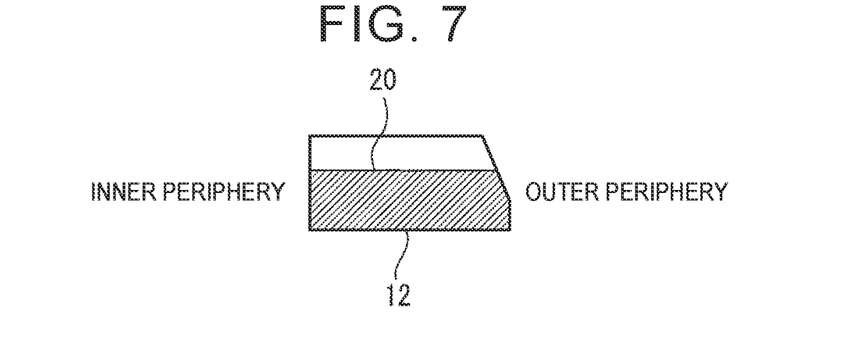
FIG. 7 is a sectional view of the groove shown in FIG. 6 taken along the line VII-VII in FIG. 6.

FIG. 6 is an enlarged front view of the groove in the second pressure ring. FIG. 7 is a sectional view of the groove shown in FIG. 6, taken along the line VII-VII in FIG. 6. As shown in FIG. 6, the groove 20 is configured such that a width of the groove 20 becomes larger (i.e., the width of the groove 20 increases) toward the outer peripheral side from the inner peripheral side. Further, as shown in FIG. 7, the groove 20 is configured such that a depth of the groove 20 is constant. Here, in the second pressure ring 12 having a thickness of 1 mm, the grooves 20 having a depth of 5 μm are formed.

Figure 8:
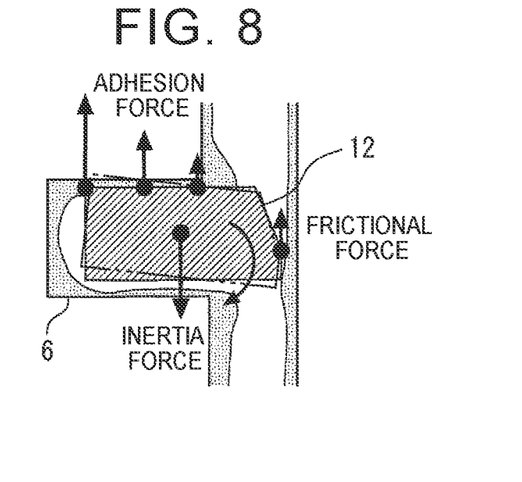
FIG. 8 is a view illustrating actions and effects of the second pressure ring according to the first embodiment.

Next, actions and effects of the second pressure ring having the above-described structure are described with reference to FIG. 8. FIG. 8 is a view illustrating actions and effects of the second pressure ring according to the first embodiment. The example shown in the drawing illustrates a state where inertia force in the downward direction and frictional force in the upward direction act on the piston 1 in the later stage of the intake stroke. As described above, each of the grooves 20 is configured such that the width of the groove 20 becomes larger (i.e., the width of the groove 20 increases) toward the outer peripheral side from the inner peripheral side. Therefore, in the upper surface of the second pressure ring 12, an area that comes into contact with the upper surface of the second pressure ring groove 6 becomes smaller toward the outer peripheral side from the inner peripheral side. Therefore, adhesion force acting on the second pressure ring 12 becomes smaller (i.e., adhesion force decreases) toward the outer peripheral side from the inner peripheral side. When adhesion force becomes smaller at the outer peripheral side, torsional moment acts on the second pressure ring 12 in a direction in which the outer peripheral side of the second pressure ring 12 is twisted in the downward direction. Therefore, it is possible to cause the second pressure ring 12 to come off from the upper surface of the second pressure ring groove 6 with smaller force, thereby making it possible to cause the second pressure ring 12 to move in quick response to the action of the inertia force.

Figure 9:
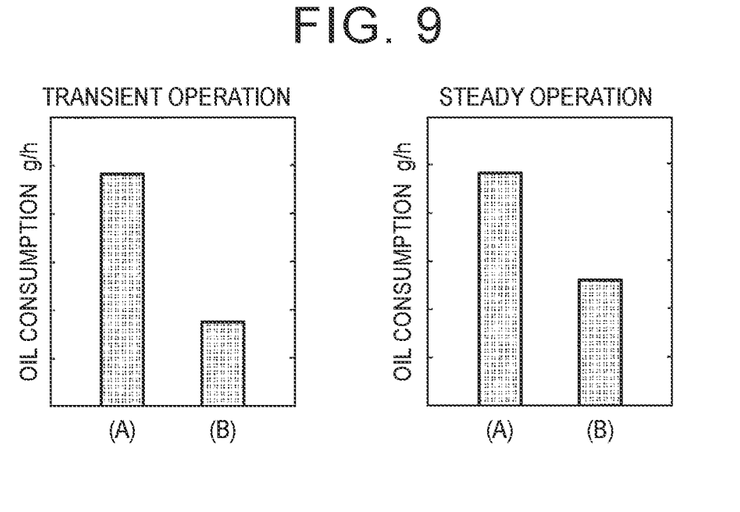
FIG. 9 is graphs indicating differences in oil consumption amount caused by presence and absence of the groove in the second pressure ring.

FIG. 9 shows graphs indicating an example of differences in oil consumption amount (i.e., an amount of consumed oil) caused by presence and absence of the groove in the second pressure ring. In FIG. 9, (A) shows an oil consumption amount when the second pressure ring 12 without the grooves 20 is used, and (B) shows an oil consumption amount when the second pressure ring 12 having the grooves 20 is used. As shown in the graphs, in the structure in which the grooves 20 are provided on the upper surface of the second pressure ring 12, oil consumption is reduced during both steady operation and transient operation. Thus, with the structure of the second pressure ring 12 according to the first embodiment, it is possible to cause the second pressure ring 12 to move in quick response toward the lower surface side of the second pressure ring groove 6. Therefore, it is possible to further reduce the oil consumption amount.

Further, with the second pressure ring 12, torsional moment is generated without depending on frictional force between the second pressure ring 12 and the cylinder bore. Therefore, it is possible to reduce friction between the second pressure ring 12 and the cylinder bore, and thus, it is possible to improve fuel efficiency.

Moreover, each of the grooves 20 in the second pressure ring 12 is configured such that the groove width at the outer peripheral side is larger than the groove width at the inner peripheral side. Therefore, oil adhering to the second land is brought back into the groove 20 efficiently, and thus, it is possible to reduce adhesion force.

The structure of the second pressure ring 12 is not limited to the structure described above, and, for example, structures modified as described below may be employed. The modifications described below are not intended to deny combinations with other modifications, and a structure made by appropriate combinations with other modifications may be employed.

Figure 10:
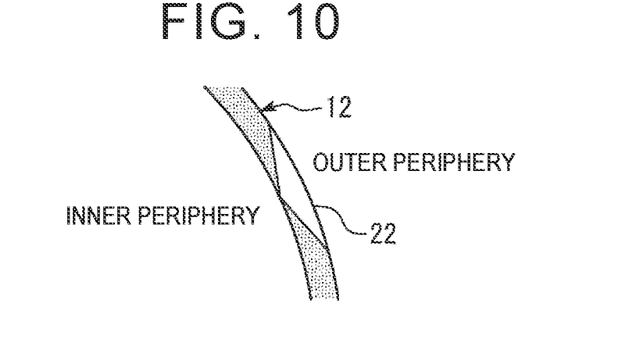
FIG. 10 is a view showing a modification of the structure of the groove formed in the second pressure ring.

FIG. 10 is a view showing a modification of the structure of the groove formed in the second pressure ring. A groove 22 shown in the drawing is formed so as to open radially toward the outer peripheral side from a point facing the inner peripheral side. With the groove 22 having this structure, actions and effects that are the same as or similar to those of the groove 20 are obtained.

Figure 11:
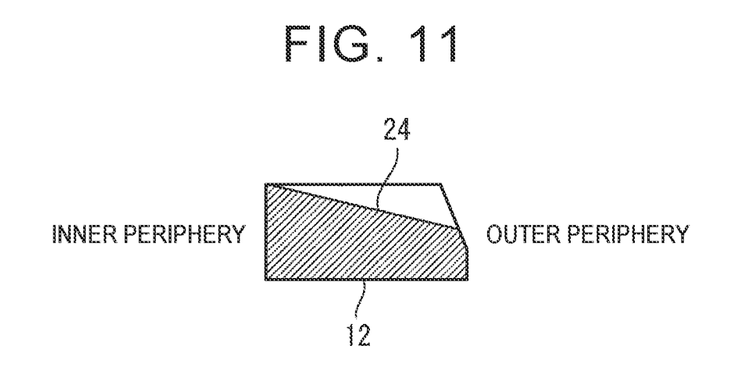
FIG. 11 is a view showing another modification of the structure of the groove formed in the second pressure ring.

FIG. 11 is a view showing another modification of the structure of the groove formed in the second pressure ring. Like FIG. 7, FIG. 11 is a sectional view of a groove 24 taken along the line VII-VII. The groove 24 shown in the drawing is formed such that a depth of the groove 24 becomes gradually larger (i.e., the depth of the groove 24 gradually increases) toward the outer peripheral side from the inner peripheral side. With the groove 24, a gap from the upper surface of the second pressure ring groove 6 becomes larger from the inner peripheral side toward the outer peripheral side of the groove 24. Therefore, adhesion force acting on the second pressure ring 12 becomes smaller toward the outer peripheral side from the inner peripheral side. Thus, torsional moment acts on the second pressure ring 12 in a direction in which the outer peripheral side of the second pressure ring 12 is twisted in the downward direction. Therefore, it is possible to cause the second pressure ring 12 to move in quick response to an action of inertia force. Further, since the groove 24 in the second pressure ring 12 is configured such that the groove depth at the outer peripheral side is larger than the groove depth at the inner peripheral side, oil adhering to the second land is brought back into the groove 24 efficiently, thereby reducing adhesion force. The width of the groove 24 may become larger toward the outer peripheral side from the inner peripheral side, or the width of the groove 24 may be constant. That is, the groove 24 may be configured such that at least one of the width and the depth of the groove 24 becomes larger toward the outer peripheral side from the inner peripheral side.

In addition to or instead of the grooves 20 provided on the upper surface of the second pressure ring 12, grooves that are the same as or similar to the grooves 20 may be provided on the lower surface of the second pressure ring 12. With this structure, when inertia force in the upward direction acts during the later stage of the compression stroke or the exhaust stroke of the internal combustion engine, it is possible to cause the second pressure ring 12 to move in quick response toward the upper surface side of the second pressure ring groove 6. Thus, it is possible to reduce an amount of oil that moves up from the third land to the second land through the second pressure ring groove 6, thereby reducing oil consumption.

Figure 12:
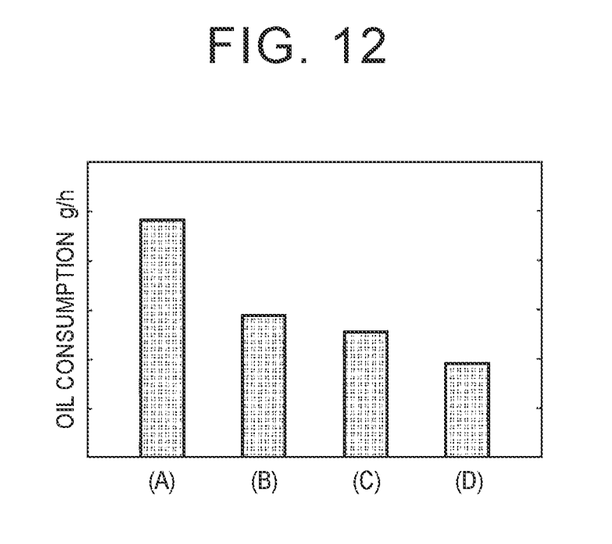
FIG. 12 is a graph indicating an example of differences in oil consumption amount caused by disposition of the groove in the second pressure ring.

FIG. 12 is a graph indicating an example of differences in oil consumption amount caused by disposition of the groove in the second pressure ring. In this graph, (A) indicates an oil consumption amount when the second pressure ring 12 without the grooves 20 is used, (B) indicates an oil consumption amount when the second pressure ring 12 having the grooves 20 on the lower surface is used, (C) indicates an oil consumption amount when the second pressure ring 12 having the grooves 20 on the upper surface is used, and (D) indicates an oil consumption amount when the second pressure ring 12 having the grooves 20 on the upper surface and the lower surface is used. From the example shown in the graph, it is understood that oil consumption is reduced with the structure in which the second pressure ring 12 has the grooves 20 on the upper surface or the lower surface, as compared to the structure where no grooves are provided. Also, oil consumption is reduced further with the structure in which the second pressure ring 12 has the grooves 20 on the upper surface and the lower surface.

What is claimed is:

1. A pressure ring comprising:
   a first pressure ring fitted in a first ring groove of a piston; and
   a second pressure ring fitted in a second ring groove of the piston, and positioned between the first pressure ring and an oil ring, wherein:
   the second pressure ring is provided with a groove that extends across a surface of the second pressure ring from an inner peripheral side surface to an outer peripheral side surface; and
   the groove is configured such that at least one of a width and a depth of the groove becomes larger toward the outer peripheral side surface from the inner peripheral side surface.

2. The pressure ring according to claim 1, wherein the groove is configured such that the width of the groove becomes larger toward the outer peripheral side surface from the inner peripheral side surface, and the depth is constant.

3. The pressure ring according to claim 1, wherein the groove is configured such that the depth of the groove becomes larger toward the outer peripheral side surface from the inner peripheral side surface, and the width is constant.

4. The pressure ring according to claim 1, wherein the groove is provided on an upper surface of the second pressure ring.

5. The pressure ring according to claim 1, wherein the groove is provided on a lower surface of the second pressure ring.

6. The pressure ring according to claim 1, wherein the second pressure ring is provided with a plurality of the grooves.

* * * * *

UNITED STATES PATENT AND TRADEMARK OFFICE
CERTIFICATE OF CORRECTION

PATENT NO. : 10,605,366 B2
APPLICATION NO. : 15/950744
DATED : March 31, 2020
INVENTOR(S) : Hisashi Ohki et al.

It is certified that error appears in the above-identified patent and that said Letters Patent is hereby corrected as shown below:

On the Title Page

Item (72), inventor 1, city, delete "Numazu" and insert --Numazu-shi Shizuoka-ken--, therefor.

Item (72), inventor 2, city, delete "Mishima" and insert --Mishima-shi Shizuoka-ken--, therefor.

Item (72), inventor 3, city, delete "Susono" and insert --Susono-shi Shizuoka-ken--, therefor.

Item (72), inventor 4, city, delete "Mishima" and insert --Mishima-shi Shizuoka-ken--, therefor.

Item (72), inventor 5, city, delete "Izunokuni" and insert --Izunokuni-shi Shizuoka-ken--, therefor.

In the Specification

In Column 5, Line 33, after "shown", delete "m" and insert --in--, therefor.

Signed and Sealed this
Nineteenth Day of May, 2020

Andrei Iancu
*Director of the United States Patent and Trademark Office*